United States Patent
Walsh et al.

(10) Patent No.: US 8,700,449 B2
(45) Date of Patent: Apr. 15, 2014

(54) TARGETED ADVERTISEMENT IN THE DIGITAL TELEVISION ENVIRONMENT

(75) Inventors: Brendan Walsh, San Diego, CA (US); Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 1332 days.

(21) Appl. No.: 11/928,203

(22) Filed: Oct. 30, 2007

(65) Prior Publication Data

US 2008/0109376 A1 May 8, 2008

Related U.S. Application Data

(60) Provisional application No. 60/863,536, filed on Oct. 30, 2006.

(51) Int. Cl.
*G06Q 30/00* (2012.01)
(52) U.S. Cl.
USPC ......................................................... 705/14.1
(58) Field of Classification Search
USPC ......................................................... 705/14.1
See application file for complete search history.

(56) References Cited

U.S. PATENT DOCUMENTS

| | | | |
|---|---|---|---|
| 5,155,591 A | 10/1992 | Wachob | |
| 5,724,521 A * | 3/1998 | Dedrick | 705/26.1 |
| 5,754,939 A | 5/1998 | Herz et al. | |
| 5,974,398 A | 10/1999 | Hanson et al. | |
| 6,324,519 B1 * | 11/2001 | Eldering | 705/14.66 |
| 2003/0149618 A1 * | 8/2003 | Sender et al. | 705/14 |

OTHER PUBLICATIONS

International Search Report and Written Opinion mailed Mar. 4, 2008 for PCT/US07/83039 filed Oct. 30, 2007.

* cited by examiner

*Primary Examiner* — Daniel Lastra
(74) *Attorney, Agent, or Firm* — Ardeshir Tabibi, Esq.; Kilpatrick Townsend & Stockton LLP

(57) ABSTRACT

A method for targeted advertisement includes storing a profile tag associated with each user in a device maintained by that user. Each profile tag includes the demographic information of its associated user. A multitude of target tags are also transmitted to the users. Each target tag is associated with an advertiser and includes the demographic information of the users. The advertisements and their corresponding target tags are transmitted and cached in the devices maintained by the users. The number of matches between the target tags and the user profiles are supplied to their respective advertisers. The advertisers use the matching number to modify the prices they are willing to offer for the commercial break. The target tags include information that is used to select one of the cached advertisement for playing during the commercial break.

53 Claims, 3 Drawing Sheets

TARGETED ADVERTISEMENT IN THE DIGITAL TELEVISION ENVIRONMENT

CROSS-REFERENCES TO RELATED APPLICATIONS

The present application claims benefit under 35 USC 119 (e) of U.S. provisional Application No. 60/863,536, filed on Oct. 30, 2006, entitled "Targeted Advertisement In The Digital Television Environment," the content of which is incorporated herein by reference in its entirety.

BACKGROUND OF THE INVENTION

Television advertisements have traditionally used viewership statistics such as those provided by Nielsen ratings to select which advertisements to show during a given program. This method for reaching potential markets is far less precise than Internet advertisement, which uses available knowledge of the web surfer's preferences (i.e., search terms) and past viewing history to place advertisements in a targeted manner so that the most relevant advertisements are seen by the people most likely to be interested in the products and services being advertised.

With the advent of digital television (DTV) standards such as DVB-H, Media-FLO™, T-DMB, and ISDB-T 1/3 segment, a wide range of mobile handset users and non-mobile digital television viewers become potential targets of advertisement.

BRIEF SUMMARY OF THE INVENTION

In accordance with one embodiment of the present invention, a method for targeted advertisement includes, in part, storing a profile tag associated with each user in a device maintained by that user. Each profile tag includes the demographic information of its associated user. A multitude of target tags each associated with an advertisement is also transmitted to the users. The target tags include the demographic information of the targeted users. The advertisements and their corresponding target tags are transmitted and cached in the devices maintained by the users. The number of matches between the target tags and the user profiles are supplied to their respective advertisers. The advertisers use the matching number to modify the prices they are willing to offer for the right to advertise during the commercial break. The target tags include information that is used to select one of the cached advertisement for playing in a commercial space or commercial break.

In one embodiment, the advertisements are transmitted using a logical channel different than a logical channel used to broadcast regular programming. The logical channel used to transmit advertisement has a data rate lower than the data rate of the logical channel used to transmit regular programming. The regular programming interrupted during the commercial break is resumed in a time-shifted manner following the termination of the first commercial break. In another embodiment, the advertisement may be displayed on a portion of the screen simultaneously with the regular programming.

In one embodiment, the played advertisement is stored in a cache and is periodically refreshed. The number of interactions between the user and the advertisement stored in the cache is tracked and supplied to the advertiser. In one embodiment, each profile tag further includes preference information supplied by its user in an optional survey. The preference information may be periodically updated in accordance with the user's behavior. In one embodiment, the number of matches for each advertisement is further defined by geographical locations of the users.

In one embodiment, after playing the advertisement, a web browser is loaded to enable the user to access a web site to make an inquiry about the advertised product/service. In another embodiment, a phone number is automatically dialed to enable the user to make an inquiry about the advertised product/service.

DETAILED DESCRIPTION OF THE INVENTION

In accordance with one embodiment of the present invention, targeted advertisements are delivered to mobile handset, such as cell phone users (subscribers), as well as to non-mobile digital television viewers in a manner that maximizes its effectiveness and potential benefits to the advertisers and the service providers. In one embodiment, the present invention enables the broadcast advertiser to deliver commercial information (advertisement) to targeted audiences in a timely manner that uses the broadcast bandwidth efficiently. The advertisement is stored and viewer feedback is provided, thus allowing the advertiser to consider the amount paid to the service provider for the advertisement and further to monitor the effectiveness of the advertisement. In one embodiment, the consideration of the amount paid by the advertiser is established through a bidding process carried out in real-time and based on feedbacks from the handsets. Accordingly, the present invention maximizes the value of the broadcast medium to both the advertisers and the broadcast service providers by enabling them, in part, to efficiently price and deliver the advertisements in a timely manner, as described further below. The following description applies equally to handheld mobile digital devices as well as to any other digital device capable of receiving and displaying digital video and audio data.

Figure 1:
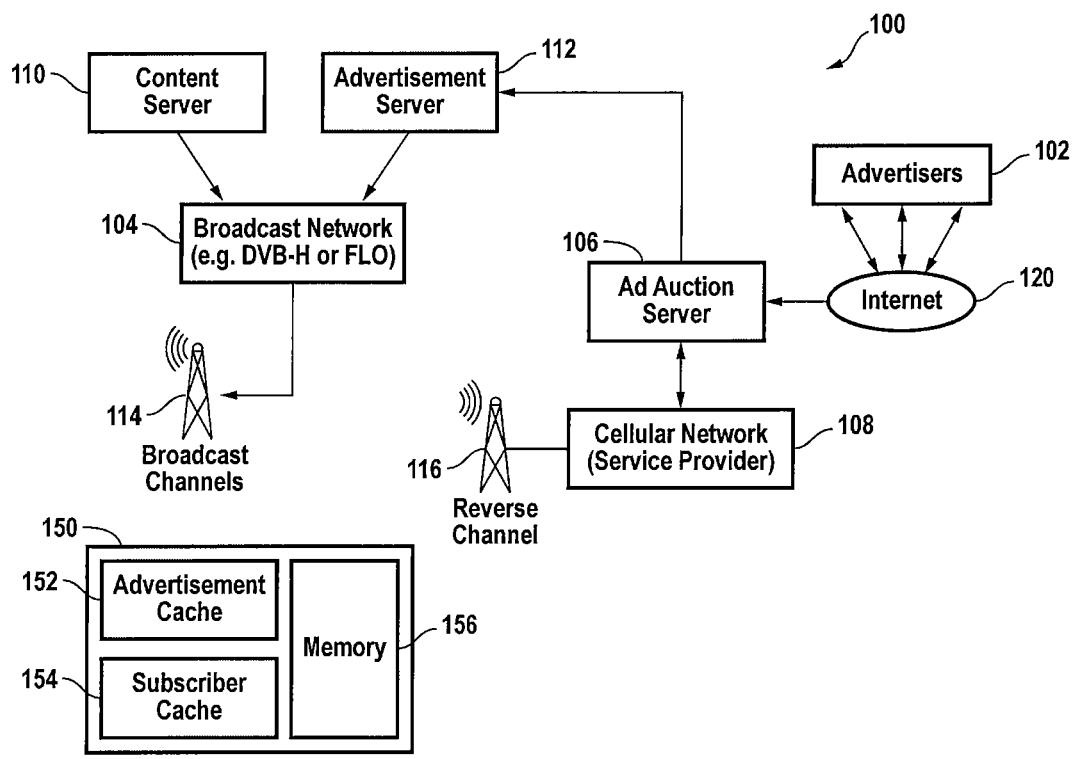
FIG. 1 is a high-level block diagram of an exemplary system adapted to deliver targeted advertisement in a digital television/video format, in accordance with one embodiment of the present invention.

FIG. 1 is a high-level block diagram of an exemplary system 100 adapted to deliver targeted advertisement in a digital television/video format, in accordance with one embodiment of the present invention. In this exemplary embodiment, advertisers 102 and service providers 104 negotiate to deliver advertisements to mobile handset or digital television receiver 150. To achieve this and as described further below, in one embodiment, advertisers 102 compete for a commercial time slot and enter into a bidding process facilitated by auction server 106. The advertiser with a winning bid secures the right to have its commercial played to the targeted users. In another embodiment, the advertiser who has paid a lock-in rate is accorded the time slot for its commercial. The lock-in rate could be fixed or float to match or exceed the highest bid.

In accordance with one aspect of the present invention, the demographic information of the users as well as any preference information the user (hereinafter alternatively referred to herein as subscriber) provides, for example, in an optional a priori survey, is used to determine what advertisements to cache and/or play during a given commercial break. When the mobile handset device includes a location identifier, the user's location which is subject to dynamic changes, may also be used in this determination. Such demographic, geographic and preference information is referred to herein as tag data or tag profile, and is stored on the handset in a coded form when the handset is activated. The preference information may be updated over time with additional surveys or by passively monitoring the habits and behaviors of its respective subscriber.

The advertiser or broadcaster attaches target tags to the advertisement; the tags contain characteristics of the target audience. As described further below, in one embodiment, an advertisement is played to a user when there is a match between the user's tag profile and the target tag included in the advertisement. Matching can be assessed by a variety of flexible algorithms such as detecting whether the least mean squared error between the advertisement tag and the subscriber's tag falls within a certain range. These algorithms can be set by the advertiser and run on the mobile handset device to identify which subscribers are most receptive to viewing the advertisement. Such an advertisement is referred to hereinbelow as a matched advertisement. A matched advertisement thus substantially increases the value of that advertisements to the advertiser by ensuring that it is viewed by an audience most likely to interact positively to it, and to make further inquiry and/or purchase the advertised product or service. At the same time, the broadcaster can sell the same time slot for an advertisement to several different advertisers targeting a viewing audience with a mix of tag profiles, thereby increasing the advertisement revenue. The target tag contains pricing information representing the amount the broadcaster has offered to pay for the advertisement. A previously cached advertisement can have its target tag replaced or modified to reflect price adjustments made by the advertiser. The pricing information is used to select one of the cached advertisements for playing during the designated commercial break.

As is well known, in a television broadcast, advertisements are typically inserted during so-called commercial breaks which can last for some set period of time, such as 15 seconds or 30 seconds. Other breaks may also occur during broadcasts. For example, in some standards such as the DVB-H standard, there may be a delay (latency) between the time when the user selects a logical channel and the time when the selected channel content is displayed on the screen. In accordance with one embodiment of the present invention, the service provider inserts a matched advertisement during such a latency. The latency may occur upon initial selection of the logical channel or when switching between the channels occur. In some embodiments, additional latency is introduced to provide the time required to insert the advertisement. In other embodiments, advertisements are displayed on a small portion of the viewable area of the screen dedicated to advertising.

In some embodiments, the advertisement matching, i.e., the comparison between the tag profile and the target tag, is performed on the handset. In yet other embodiments, the advertisement matching is performed using a server and a database remote to the handset. Such a remote matching may be carried out at the base station or anywhere on a network or the Internet that is coupled to the base station. For example, the advertisement matching may be done in a cable distribution head end where the video programming is distributed from.

The broadcast network 104 transmits data containing the advertisements on one logical channel using advertisement server 112 while at the same time sending a live broadcast on another logical channel using content server 110. The advertisement may thus be transmitted at a low data rate, thereby conserving broadcast bandwidth and also achieving greater reliability of data transmission, e.g. by using a higher coding rate for the advertisement data stream. The advertisement, presented to the user during commercial breaks, may be displayed in a separate area of the screen, or as a background image on the handset. It is understood that the advertisement may include audio, video, pictures, slideshows, etc. It is also understood that the advertisement may be intended for a particular program, a category of programs or any program the subscriber watches.

In one embodiment, handset 150 includes an advertisement cache 152 and a subscriber cache 154. The advertisement cache 152 is configured to store advertisement information (e.g. video, sound), that are automatically stored on the handset and displayed to the subscriber at the selected advertisement spot (commercial break). The subscriber cache 154 is content or advertisement which the subscriber selects for storage on the handset in order to view at a later time in a time-shifted manner. The size of each of the handset caches is programmable based upon the capabilities of the handset and other items stored therein. Such information may be stored remotely, i.e., outside the user's digital device to enable sending advertisements that are likely to fit in the cache. Any type of storage medium, e.g., static random access memory (SRAM), dynamic random access memory (DRAM), hard disk, flash memory, etc, may be used for caches. The stored advertisements, the interaction between the subscriber and the stored advertisement, the number of viewings of the advertisement, its dwell time, etc. may be tracked and reported to the advertiser.

A number of different algorithms or quantitative metrics may be used to determine the similarity and/or disparity between the user's tag profile and the target tag to determine if there is a match between the two and to decide whether to cache the advertisement or not. Such algorithms determine a matching score or a measure of similarity used to cache only the most relevant advertisements and discard those that are not. The amount of advertisement stored in the cache is used to determine how many advertisements to keep at any given time.

An advertisement may have a number of versions each customized for a different demographic, handset location and cache size. For example, an older phone may get a slideshow instead of an animation or video. Also, a database containing geographical information may be used to preferentially display advertisements on handsets within a certain proximity to defined business locations offering the advertised product or service.

Figure 2A:
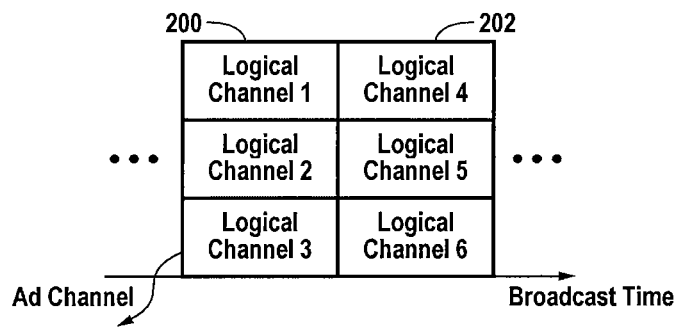
FIG. 2A shows a number of exemplary logical channels and time slots used for broadcasting regular programs as well as advertisements, in accordance with one embodiment of the present invention.
Figure 2B:
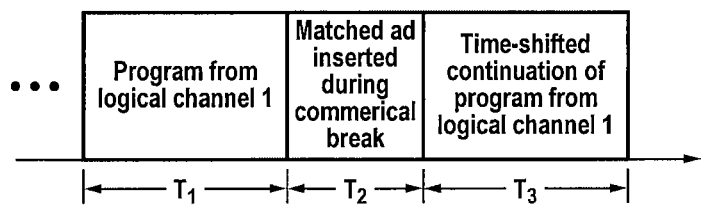
FIG. 2B shows an exemplary time sequence according with which regular programs and advertisements are broadcast.

FIG. 2A shows a number of exemplary logical channels and time slots used for broadcasting content (regular programming) as well as advertisements, in accordance with one embodiment of the present invention. Logical channels 1, 2 and 3 are used for broadcasting during time slot 200, and logical channels 4, 5 and 6 are used for broadcasting during time slot 202. FIG. 2B shows the time sequence according with which content and advertisements are broadcast. During period $T_1$ content is broadcast using logical channel 1. During period $T_2$ when the commercial break occurs, the program is interrupted and the matched advertisement inserted earlier in the device is displayed to the user. During period $T_3$ the broadcasting of program resumes on a time shifted basis.

Advertisers can also pay higher rates to ensure their ads are preferentially cached when competing for the same commercial breaks. Assume, for example, that two or more advertisements intended for broadcast during a particular commercial break are matched to a group of users. To secure the right to advertisement during a commercial break, the advertisers enter into a bidding contest and bid up their offers until the advertiser whose offer is accepted secured the right to broadcast its advertisement during that break. In one embodiment, the bidding adjustment is carried out in real time—to increase the likelihood that the advertisement is cached—based on the feedback that the advertiser receives, as described further below.

Referring to FIG. 1, standards such as DVB-H and Media FLO, include provisions for a reverse channel 116, which enable the user to send data back to the broadcaster through the handset's mobile phone data link, e.g., GSM, EDGE, WCDMA or other physical layers). In accordance with one embodiment of the present invention, the reverse channel 116 is used, in part, to provide real-time feedback to the advertiser regarding the number of subscriber tag profiles that have matched an advertisement's target tag for any given commercial break, and/or provide feedback regarding the location of the subscriber handsets/terminals. As described above, an advertiser may, in response to the feedback, change the advertisement, offer to pay a higher rate or a better financial package for the right to broadcast the commercial during the target commercial break so as to increase the rate at which the advertisement is cached. The bidding may continue until the commercial break occurs. As also described above, in some embodiments, the advertiser who has paid a lock-in rate is accorded the time slot for its commercial. The lock-in rate may be fixed or float to match or exceed the highest bid. Advertisers may be charged based on the frequency that their bids win matches as well as the particular times during which the advertisement is scheduled to be broadcast. For example, the cost for advertisement varies depending on the time of the day or the programs during which the advertisement(s) is scheduled to be played.

Figure 3:
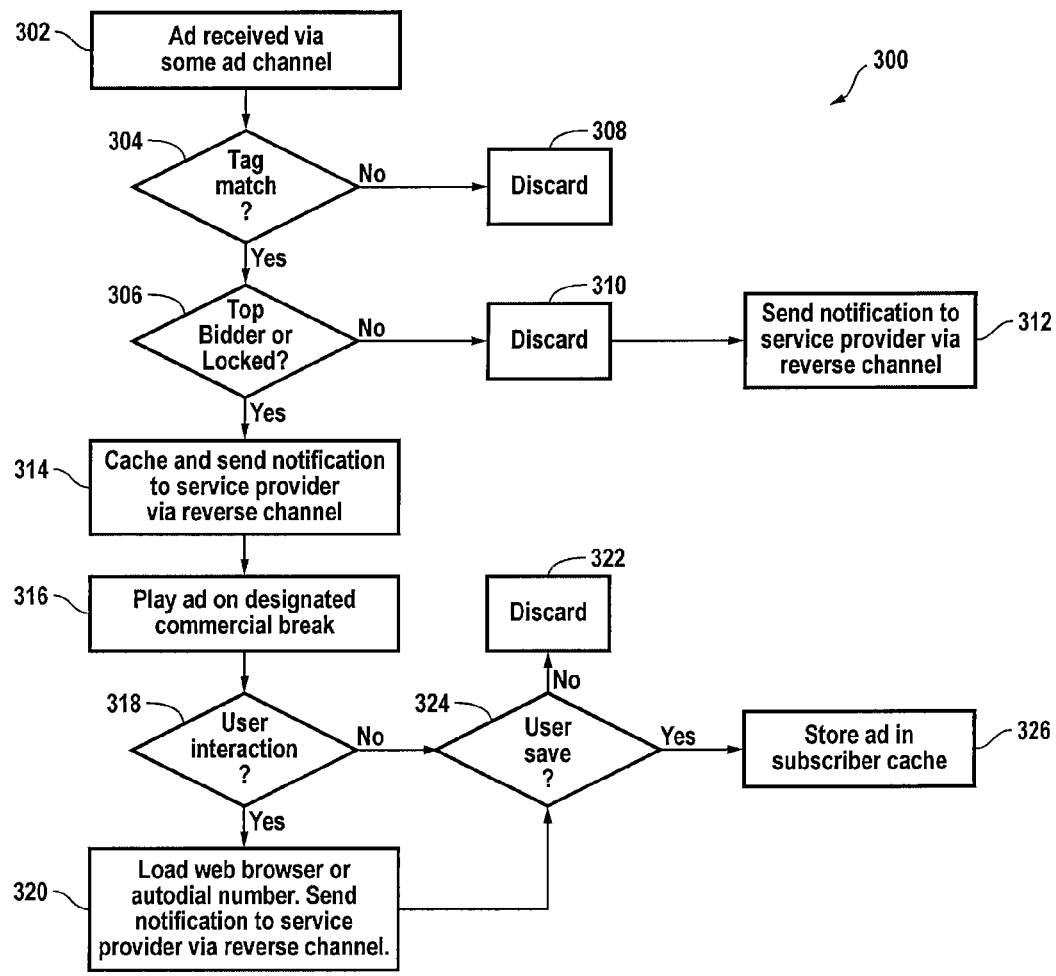
FIG. 3 is a flowchart of steps used to cache an advertisement, in accordance with one embodiment of the present invention.

FIG. 3 is a flowchart 300 of steps used to cache an advertisement, in accordance with one embodiment of the present invention. The advertisement is received 302 via a broadcast channel. Next, a matching operation 304, using any one of a number of algorithms or a quantitative metrics, is performed to determine whether a match exists between the subscriber's profile tag and the target tag of the advertisement. If an acceptable match is not detected 308, the advertisement is discarded and thus is not cached. If an acceptable match is detected 304, and the advertiser has an offer that is accepted or the advertiser has a lock-in rate 306, the advertisement is cached 314 and a corresponding notification is sent to the service provider via a reverse channel. If an acceptable match is detected 304 but the advertiser's offer is not accepted by the service provider, the advertisement is discarded 310 and a corresponding notification is sent to the service provider via the reverse channel.

Assuming an agreement is reached between the advertiser and the service provider, after the advertisement is played 316, if the user chooses not to interact 324 with the played advertisement, the user is provided with an option to save the advertisement 324. The advertisement is either discarded 322 or is saved 324 in the subscriber cache, depending on the user's selected option. The user may select to act upon the viewed commercial 318. If the user so selects, in one embodiment, a web browser is loaded to enable the user to make additional inquiries about, or to attempt to purchase, the advertised product/service from the advertiser or related companies. The web access may be carried out to keep a count of the activity and the tag profile of the user making the web access. To maintain the subscriber's privacy, the identity of the subscriber is disassociated from his/her profile. In another embodiment, in response to the user's selection 318, a phone number is dialed to enable the user to make additional inquiries about, or to attempt to purchase, the advertised product/service.

Figure 4:
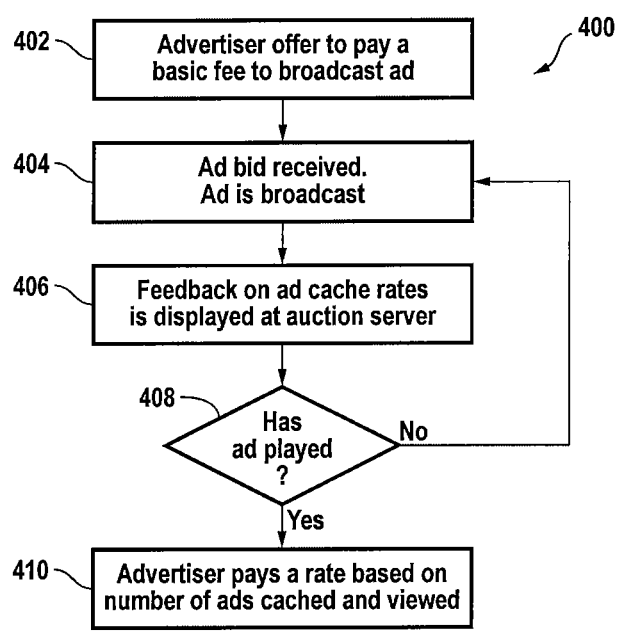
FIG. 4 is a flowchart of steps used to cache an advertisement, in accordance with another embodiment of the present invention.

FIG. 4 is a flowchart 400 of steps used to bid for an advertisement to be viewed during a commercial break, in accordance with another embodiment of the present invention. The advertiser offers to pay 402 a basic fee to have its advertisement viewed. The service provider receives the offer price and transmits 404 the advertisement. Thereafter, the number of users whose tag profiles match the target tag of that advertisement is determined and fed back 406 to the advertiser. The advertiser is thus enabled to adjust the offer price based on the number of matches until the advertisement is played 408. The advertiser pays a final rate 410 based on the number of advertisements that are cached and viewed.

In some embodiments, the advertisements are inserted at a frequency determined entirely by the subscription rate that the viewer is paying. This allows the viewer to trade off subscription cost for the convenience of advertisement-free viewing. To achieve this, in one embodiment, the service provider can broadcast a given program over a channel continuously without inserting any commercial breaks. The handset, based on a subscriber's level of payments, is adapted to select the frequency with which commercial breaks occur and insert a matching advertisement by retrieving it from the viewer's advertisement cache. While the advertisement is being displayed, the regular programming is stored in a buffer which is thereafter retrieved and played in a time-shifted manner and after the advertisement is played.

Such embodiment may be used in demographic segments that are relatively more price sensitive and are willing to endure more frequent commercial breaks in order to reduce their monthly subscription rates. The advertisement frequency is determined using the information stored in the handset related to subscription rates. The subscriber may choose to watch certain programs and channels without advertising by paying an additional amount over a subscription that would normally have the advertisement.

Some embodiments of the present invention may credit the user for watching certain advertisement and to reduce the occurrence of future advertisements as a consequence. For example, a played long infomercial may allow one or more future programs to have no or a relatively reduced number of advertisements. A positive reaction by the subscriber to a viewed advertisement that leads to a call to advertiser or to a loading of an advertiser's web page may also accumulate credits. Accordingly, in such embodiments, enhanced exposure to advertisements provides credits toward viewing future commercial-free programs.

The above embodiments of the present invention are illustrative and not limiting. Various alternatives and equivalents are possible. The invention is not limited by the type of digital device, mobile, etc. used for targeted advertisement. The invention is not limited by the rate used to transfer the data. Other additions, subtractions or modifications are obvious in view of the present disclosure and are intended to fall within the scope of the appended claims.

What is claimed is:

1. A method for targeting an advertisement, the method comprising:
    storing a profile tag in each of a plurality of digital devices each associated with a different user, each profile tag comprising demographic information of the user associated with the digital device;
    transmitting first and second target tags each comprising demographic information of a plurality of users, the first target tag being associated with a first advertisement and the second target tag being associated with a second advertisement;
    caching the first and second advertisements in the plurality of digital devices;
    identifying a first number of matches defined by a first measure of similarity between the first target tag and the profile tags of the plurality of users;
    supplying the first number to a first advertiser attempting to play the first advertisement during a first commercial break;
    identifying a second number of matches defined by a second measure of similarity between the second target tag and the profile tags of the plurality of users;
    supplying the second number to a second advertiser attempting to play the second advertisement during the first commercial break;
    enabling the first and second advertisers to compete for a right to advertise during the first commercial break, said first and second advertisers to make offers using the first and second matching numbers;
    using the offers to select one of the first and second advertisements; and
    playing the selected advertisement during the first commercial break.

2. The method of claim 1 further comprising:
    transmitting the first advertisement using a first logical channel different than a second logical channel used to broadcast regular programming; and
    transmitting the second advertisement using one of the first logical channel and a third logical channel.

3. The method of claim 1 further comprising:
    caching the first and second target tags in the plurality of digital devices.

4. The method of claim 2 wherein each of said first and third logical channels has a data rate lower than a data rate of the second logical channel.

5. The method of claim 1 further comprising:
    storing the regular program interrupted during the first commercial break;
    playing one of the cached first and second advertisements during the first commercial break; and
    resuming playing of the time-shifted regular program following termination of the first commercial break.

6. The method of claim 5 further comprising:
    storing the played advertisement in a second cache.

7. The method of claim 6 further comprising:
    tracking a number of interactions between a user and the advertisement stored in the second cache of the digital device associated with the user.

8. The method of claim 7 wherein each profile tag further comprises preference information.

9. The method of claim 8 wherein said preference information is updated in accordance with the user's behavior.

10. The method of claim 9 wherein said preference information is supplied by its user in a survey.

11. The method of claim 8 wherein said first number of matches are further defined by geographical locations of the plurality of digital devices.

12. The method of claim 11 wherein said first number of matches are determined by the plurality of digital devices.

13. The method of claim 11 wherein said first number of matches are determined by a remote server.

14. The method of claim 6 further comprising:
    refreshing the advertisement stored in the second cache.

15. The method of claim 11 further comprising:
    loading a web browser to enable a user to whom one of the first and second cache advertisements is played to access a web site to make an inquiry about the advertised product/service.

16. The method of claim 11 further comprising:
    autodialing a phone number to enable a user to whom one of the first and second cache advertisements is played to make an inquiry about the advertised product/service.

17. The method of claim 11 further comprising:
    establishing a subscription fee of at least one of the users in accordance with a number or duration of commercial breaks the user is caused to experience.

18. The method of claim 1 wherein the selection is made using data included in the target tags of the first and second target tags.

19. A method for targeting an advertisement, the method comprising:
    storing a profile tag in each of a plurality of digital devices each associated with a different user, each profile tag comprising demographic information of the user associate d with the digital device;
    transmitting an advertisement and an associated target tag comprising demographic information of a plurality of users;
    caching the advertisement and the target tag in the plurality of digital devices;
    identifying a number of matches defined by a measure of similarity between the target tag and the profile tags of the plurality of users;
    supplying the identified number to an advertiser attempting to play the advertisement during a commercial break;
    enabling the advertiser and a service provider to negotiate an agreement for the advertisement to be played during the commercial break, said offer being defined by the identified number;
    playing the advertisements during the first commercial break if the agreement is reached.

20. The method of claim 19 further comprising:
    transmitting the advertisement using a first logical channel different than a second logical channel used to broadcast regular programming; said first logical channel having a lower data rate than the second logical channel.

21. The method of claim 20 further comprising:
    storing the regular programming interrupted during the first commercial break;
    playing the cached advertisements during the first commercial break; and
    resuming playing of the time-shifted regular programming following termination of the first commercial break.

22. The method of claim 21 further comprising:
    caching the played advertisement in a second cache.

23. The method of claim 22 further comprising:
    tracking a number of interactions between a user and the advertisement stored in the second cache of the user's associated digital device.

24. The method of claim 23 wherein each profile tag further comprises preference information.

25. The method of claim 24 wherein said preference information is updated in accordance with the user's behavior.

26. The method of claim 25 wherein said preference information is supplied by its user in a survey.

27. The method of claim 19 wherein said number of matches is further defined by geographical locations of the plurality of digital devices.

28. The method of claim 19 wherein said number of matches is determined by the plurality of digital devices.

29. The method of claim 19 wherein said first number of matches is determined at a remote server.

30. The method of claim 22 further comprising:
refreshing the advertisement stored in the second cache.

31. The method of claim 27 further comprising:
loading a web browser to enable a user to whom the cached advertisement is played during first commercial break to access a web site to make an inquiry about the advertised product/service.

32. The method of claim 27 further comprising:
autodialing a phone number to enable a user to whom the cached advertisement is played during the commercial break to make an inquiry about the advertised product/service.

33. The method of claim 19 further comprising:
establishing a subscription fee of at least one of the plurality of users in accordance with a number or duration of commercial breaks the user is caused to experience.

34. A digital receiver comprising:
a memory configured to store a profile tag comprising demographic information of an associated user;
a first cache configured to store a plurality of advertisements and a plurality of target tags received via a first channel, each target tag being associated with a different one of a plurality of advertisements and comprising an offer price for the associated advertisement; said digital receiver further configured to:
compare the profile tag to each of the target tags to identify a plurality of measures of similarity;
transmit the plurality of measures of similarity;
compare the plurality of advertisement offers included in the plurality of target tags; and
select and play one of the plurality of stored advertisements during a commercial break.

35. The digital receiver of claim 34 wherein said digital receiver is configured to receive the plurality of advertisements using a first logical channel different than a second logical channel used to broadcast regular programming, wherein said first logical channel has a data rate lower than a data rate of the second logical channel.

36. The digital receiver of claim 35 wherein said digital receiver is further configured to:
interrupt a regular program during the commercial break;
play the selected advertisements during the commercial break; and
resume playing the regular program following termination of the commercial break in a time-shifted manner.

37. The digital receiver of claim 36 further comprising:
a second cache adapted to store the played advertisement; said digital receiver further configured to track a number of interactions between the associated user and the advertisement stored in the second cache.

38. The digital receiver of claim 37 wherein each profile tag further comprises preference information.

39. The digital receiver of claim 38 wherein said preference information is supplied by the associated user in a survey, said preference information to be updated in accordance with the associated user's behavior.

40. The digital receiver of claim 39 wherein the measure of similarity for the digital receiver is further determined by its geographical location.

41. The digital receiver of claim 40 further comprising a module adapted to refresh the advertisement stored in the second cache.

42. The digital receiver of claim 40 further comprising a web browser adapted to enable the associated user to access a web site to make an inquiry about the advertised product/service.

43. The digital receiver of claim 40 further comprising an autodialer adapted to autodial a phone number to enable the associated user to make an inquiry about the advertised product/service.

44. A digital receiver comprising:
a memory configured to store a profile tag comprising demographic information of an associated user;
a first cache configured to store an advertisements and a target tag received via a first channel, the target tag comprising an offer price for playing the associated advertisement; said digital receiver further configured to:
compare the profile tag to the target tag to determine a measure of similarity;
transmit the measure of similarity to the advertiser;
receive an updated offer price representative of the measure of similarity; and
play the advertisement during a commercial break if the updated offer price is accepted by a service provider.

45. The digital receiver of claim 44 wherein said digital receiver is further configured to receive the advertisement using a first logical channel different than a second logical channel used to broadcast regular programming, wherein said first logical channel has a data rate lower than a data rate of the second logical channel.

46. The digital receiver of claim 45 wherein said digital receiver is further configured to:
interrupt a regular program during the commercial break;
play the advertisement during the commercial break; and
resume playing the regular program following termination of the commercial break in a time-shifted manner.

47. The digital receiver of claim 46 further comprising:
a second cache adapted to store the played advertisement; said digital receiver further configured to track a number of interactions between a user and the advertisement stored in the second cache.

48. The digital receiver of claim 47 wherein the profile tag further comprises preference information.

49. The digital receiver of claim 48 wherein said preference information is supplied by its user in a survey and is updated in accordance with the user's behavior.

50. The digital receiver of claim 49 wherein the measures of similarity is further determined by a geographical location of the digital receiver.

51. The digital receiver of claim 50 further comprising a module adapted to refresh the advertisement stored in the second cache.

52. The digital receiver of claim 51 further comprising a web browser adapted to enable the associated user to access a web site to make an inquiry about the advertised product/service.

53. The digital receiver of claim 51 further comprising an autodialer adapted to autodial a phone number to enable the associated user to make an inquiry about the advertised product/service.

* * * * *